Figure 1:
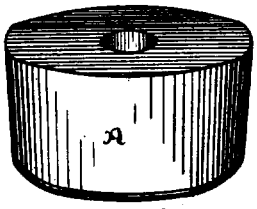

2 Sheets—Sheet 1

J. KIRBY.

Bung.

No. 9,107. Reissued Mar. 2, 1880.

Attest.
Jas. H. Strehli
E. D. Hill

Inventor.
Josiah Kirby
per Wm. Hubbell Fisher,
Atty

N. PETERS, PHOTO-LITHOGRAPHER, WASHINGTON, D. C.

J. KIRBY.

Bung.

No. 9,107. Reissued Mar. 2, 1880.

Attest.
E. R. Hill
Jno. H. Strehli

Inventor.
Josiah Kirby per
Wm. Hubbell Fisher,
Atty

N. PETERS, PHOTO-LITHOGRAPHER, WASHINGTON, D. C.

UNITED STATES PATENT OFFICE.

JOSIAH KIRBY, OF CINCINNATI, OHIO.

BUNG.

SPECIFICATION forming part of Reissued Letters Patent No. 9,107, dated March 2, 1880.

Original No. 111,352, dated January 31, 1871. Application for reissue filed December 29, 1879.

*To all whom it may concern:*

Be it known that I, JOSIAH KIRBY, of Cincinnati, Hamilton county, State of Ohio, have invented a certain new and useful Improvement in Bungs; and I do hereby declare the following to be a sufficiently full, clear, and exact description thereof to enable one skilled in the art to which my invention appertains to make and use it, reference being had to the accompanying drawings, making part of this specification.

My invention consists of a bung of a peculiar construction, specially designed for use in connection with beer-barrels, &c., where an air-vent is required to permit the drawing off of the liquid, the object of my invention being to avoid the necessity of extracting the bung for the introduction of the air-plug, and at the same time to provide for the insertion of the air-plug without a loss of the gases from the liquid.

A further object of my invention is the production of a bung which will serve for the introduction of the pipe of an air-pump for forcibly discharging the liquid to higher elevations, and one that can be readily extracted from a barrel by the use of an instrument which I have designed for this purpose, and which is secured to me by Letters Patent No. 111,351 of the United States.

Figure 3:
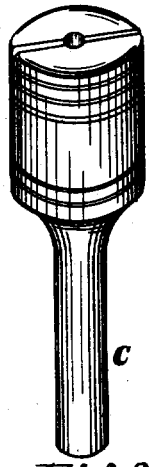
Figure 2:
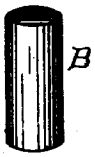
Figure 4:
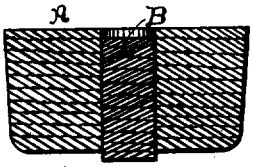
Figure 5:
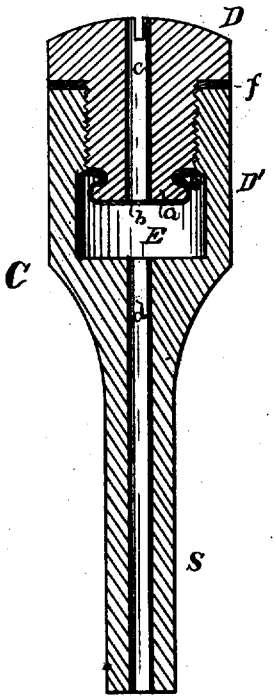

In the accompanying drawings, Figures 1 and 2 illustrate my invention. Fig. 3 is a perspective view of an air-plug of ordinary construction, and of a size adapted for use with this construction of bung. Fig. 4 is a vertical central section of the parts shown in Figs. 1 and 2 when combined. Fig. 5 is a central longitudinal section through the air-plug shown in Fig. 3, showing the interior construction.

The bung A is made of wood with the grain running horizontally, as shown in Fig. 4. Through the center of it, or thereabout, a cylindrical hole is bored or formed, into which a wooden plug, B, is tightly fitted and driven into place. The plug is turned out of wood in such manner that the grain runs at right angles to its axis, so that when driven into place the grain of the plug runs horizontally with the grain of the bung, preventing any leakage through it, which would result if the grain ran vertically.

My improvement entirely prevents the escape of gas from the interior of the cask, and also affords a ready means for introducing the shank of an air-vent, as hereinafter described, without the necessity of extracting the central plug from the bung or the bung from the cask, either of which operations would permit a considerable escape of gas before an air-plug could be inserted, which escape of gas is very detrimental to the liquid contained in the cask.

Bungs for beer-casks are ordinarily constructed so that the end will project some distance beyond the face of the cask, to permit the bung-puller to grasp it; but my bung can be made much shorter, there being no necessity for its withdrawal to admit the air-plug, as the latter can be used as a "drift" to drive in the plug B of the bung, and thereby open an aperture for its own occupancy.

The shank C of the plug, Fig. 3, is, of necessity, small, and the whole plug is made preferably of metal. It differs in no respect from ordinary ones, having a hole through its center, which is governed by a valve that admits air into the barrel and prevents, by closing, the escape of the gases.

One form of air-plug is illustrated in Figs. 3 and 5, in which the upper part or head, D, is screwed into the lower part, D′, as shown, and the interval between the two is closed by a suitable packing, *f*. The inner end of the head D is provided with a flanged extremity, *a*, over which is stretched a rubber valve, *b*, which covers the inner opening of the conduit *c*, and which is secured in position by a cord, *e*, binding it to the neck of said extremity. Through the conduits *c* and *d* air is admitted to the interior of the cask. The valve *b*, as will be seen, will allow air to pass into the cask, but will not allow any air or gas to pass out therefrom. A space, E, in the part D′ allows ample room for the play of this valve. S indicates the shank of the air-plug.

As scarcely an instant of time can elapse between the time the plug B leaves the bung and the time the hole is again closed by the air-plug C, no gas can escape from the barrel in the operation.

Important advantages in this form of bung, in addition to what has been already specified, consist in its adaptability for the insertion of a bung-puller for extracting it from a barrel after the simple driving in of the plug, and its adaptability for the introduction of the pipe of an air-pump, thus avoiding the necessity of boring a hole in the staves for such introduction.

I claim—

1. As a new article of manufacture, a wooden bung having an opening stopped by wood whose grain runs horizontally with the grain of the bung, substantially as set forth, whereby the wood stopping said opening can be displaced by the shank of the air-plug without removing the bung from the barrel and without permitting the gases in the barrel to escape, for the purposes set forth.

2. A wooden bung having an opening stopped by wood whose grain runs horizontally with the grain of the bung, in combination with an air-plug provided with a shank having a conduit and a valve to admit air to the interior of a barrel and prevent the escape of air or gas therefrom, substantially as and for the purposes specified.

3. A wooden bung having an opening provided with a central detachable wooden plug, B, for the purposes specified, when the grain ~~of the~~ plug runs horizontally with the grain of the bung.

JOSIAH KIRBY.

Attest:
R. N. WELLINGTON,
E. H. FOSTER.